Oct. 13, 1970 J. P. X. DA SILVA 3,533,657
READING-SELECTING DEVICE FOR THE OPTICAL READING OF
PERFORATIONS IN OR MARKS ON RECORDING MEDIA
Filed June 17, 1968 4 Sheets-Sheet 1

Inventor:
Jean Paul Xavier Da Silva
BY Baldwin Wight Diller & Brown
Attorneys

Inventor:
Jean Paul Xavier Da Silva
BY Baldwin Wight Diller & Brown
Attorneys

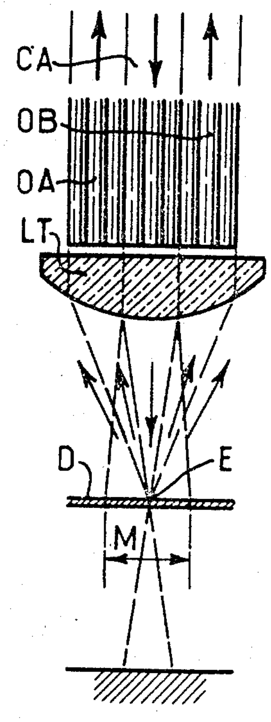
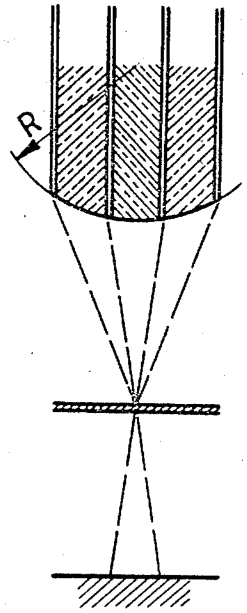
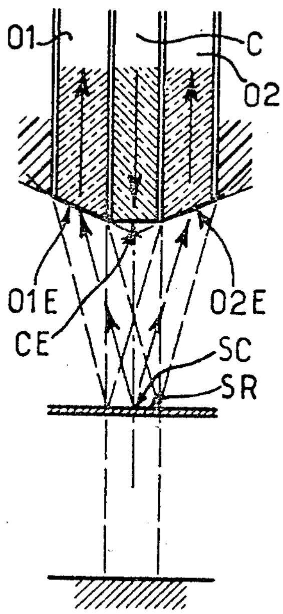
FIG.3A FIG.3B FIG.3C
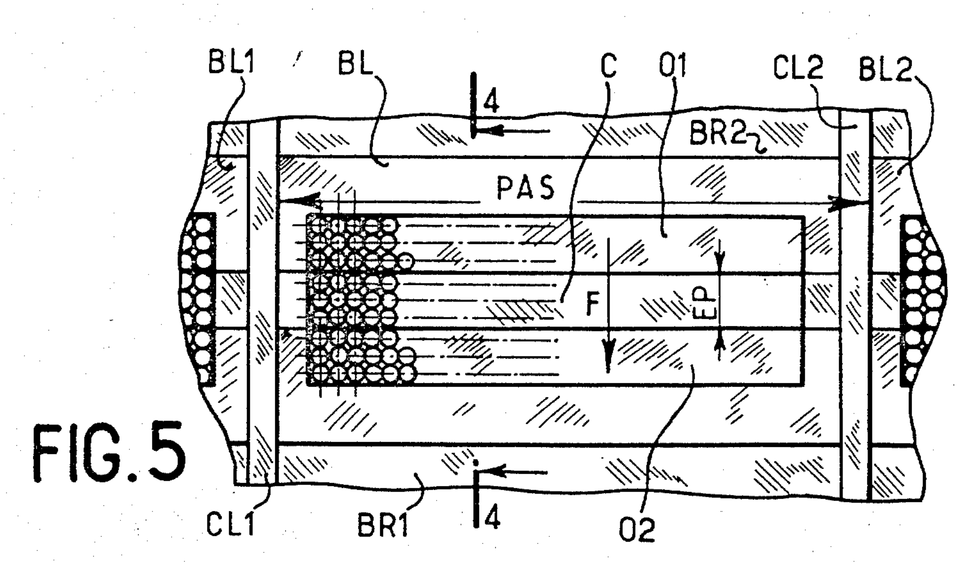
FIG.5
Inventor:
Jean Paul Xavier Da Silva
BY Baldwin Wight Diller & Brown
Attorneys Inventor:
Jean Paul Xavier Da Silva
BY Baldwin Wight Diller & Brown
Attorneys

United States Patent Office 3,533,657

Patented Oct. 13, 1970

3,533,657

READING-SELECTING DEVICE FOR THE OPTICAL READING OF PERFORATIONS IN OR MARKS ON RECORDING MEDIA

Jean Paul Xavier Da Silva, Sartrouville, France, assignor to Societe Industrielle Bull-General Electric (Societe Anonyme), Paris, France Filed June 17, 1968, Ser. No. 737,616
Claims priority, application France, June 29, 1967, 112,495
Int. Cl. G06k *7/14;* G01n *21/30*
U.S. Cl. 235—61.11 7 Claims

ABSTRACT OF THE DISCLOSURE

A reading arrangement for reading marks on and perforations in recording media, comprises a reading device composed of a single light source associated with a light-conducting channel, of a first photoelectric transducer equally responding to a mark or to a perforation and associated with another light-conducting channel and of a second photoelectric transducer located on the other side of the recording medium to receive light from the said light source through a perforation. This arrangement further comprises connecting means including selective logical circuits operative in a manner such that mark reading signals and perforation signals separately appear on respective output terminals even if marks and perforations are present on and in the same recording medium.

Figure 1A:
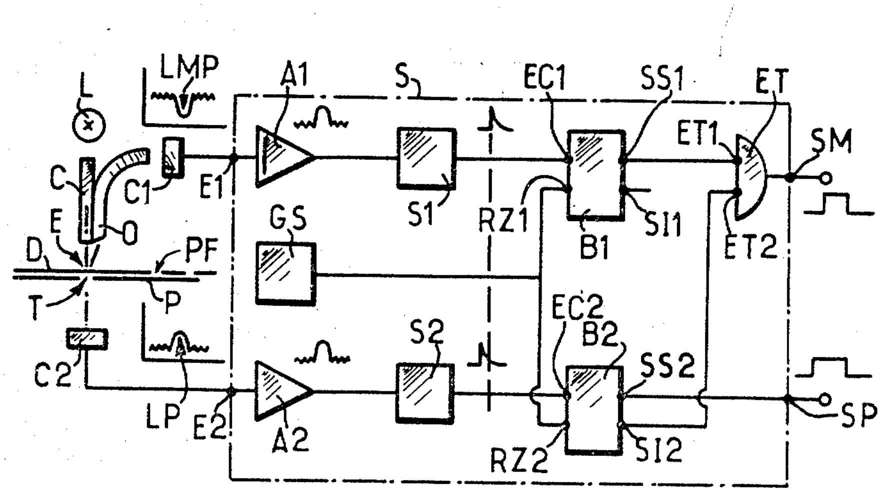

The invention relates to a reading-selecting device for photoelectrically reading perforations in and marks on recording media, such as punched cards, cheques, account cards and like documents which may be employed to control automatic data processing machines.

In this field, there are known devices which are adapted to read record perforations and devices which are adapted to read record marks. Devices are also known which are capable of reading either form of recording under the control of suitable switching means. Devices are also known which can read both marks and perforations but cannot indicate the nature of the recordings which have been read.

In the automatic data processing field, it is sometimes necessary to process data which have been recorded in one form or the other on documents, and it may be necessary to process these data differently, depending upon whether they have been recorded in one form or the other.

There are very widely employed as recording media punched cards, of which the so-called "80-column" version is universally known.

The cards can receive recordings in either form in 960 locations situated in rows and in columns.

It is known to employ record cards provided with various zones each comprising a number of columns, some of which are intended to receive recording marks, while other zones are intended to receive perforations. In machines adapted to utilise these cards, appropriate reading means are provided for reading the recordings present in the various zones. For some applications, it is necessary to complete punched recordings by means of marks manually applied in the same column zones. Machines are known which are adapted to read the marks to convert them into perforations in order to render possible the normal exploitation of these documents.

The present invention has for its object to provide a reading arrangement which renders possible the direct exploitation of documents of which some carry marks and others have perforations, or both marks and perforations, or the exploitation of mixed documents, and to increase the possibilities of utilisation of these documents, while simplifying the necessary equipment.

The invention relates to a reading-selecting device for reading marks and perforations, which supplies reading signals along one of two separate channels to enable the analysed data to be differently processed, depending upon whether the recordings read are marks or perforations, and thus to make it possible to utilise irrespectively the signals obtained by collecting them along a common channel.

A reader-selector according to the invention comprises a double reader provided with two photoelectric transducers and a logical selecting device for selecting the reading signals supplied by the two transducers. A first transducer disposed on the "marks" side of the recording media is associated with at least one light transmission channel and one light source. A second transducer is disposed on the side opposite to the marks in order to receive the light passing through the perforations. The logical selecting device comprises a first channel connected to the output of the first transducer, which channel includes square-pulse shaping circuits, and an AND circuit, of which one input is connected to the output of the shaping circuits and supplies at its output a mark reading signal. A second channel is connected to the output of the second transducer and includes pulse-shaping circuits whose output is connected to a second input of the said AND circuit and supplies a perforation reading signal. The selection device comprises in addition a logical inverting circuit and the arrangement is such that, although the first transducer responds to the presence of a perforation, a perforation reading pulse appears only at the output of a second channel. The reading device comprises an optical system provided with at least two light channels. A first channel is disposed along the axis of the optical system to bring light emanating from a light source into a location through which recording marks or perforations to be read are successively advanced, that end of the said light channel which is closer to the mark reading location being cut perpendicularly to the axis of the optical system. A second light channel comprises one or more parts, disposed beside or around the said first channel and parallel thereto to collect light reflected, in a reading location, by the recording media, the marks or the perforations which are advanced through the said location, in order to transmit the light thus collected to the first transducer. A guide plate on which the recording media are advanced has, extending along the axis of the optical system, an orifice which is so situated as to transmit to the second transducer disposed behind the said orifice, light arriving through the first channel and passing through recording perforations.

The invention also relates to a reader of relatively simple and economical construction, which has very small overall dimensions at the level of the documents, which operates reliably, is fool-proof and has high output, and which is especially adapted to effect under advantageous conditions the photoelectric reading of marks on documents and perforations therein.

Figure 2:
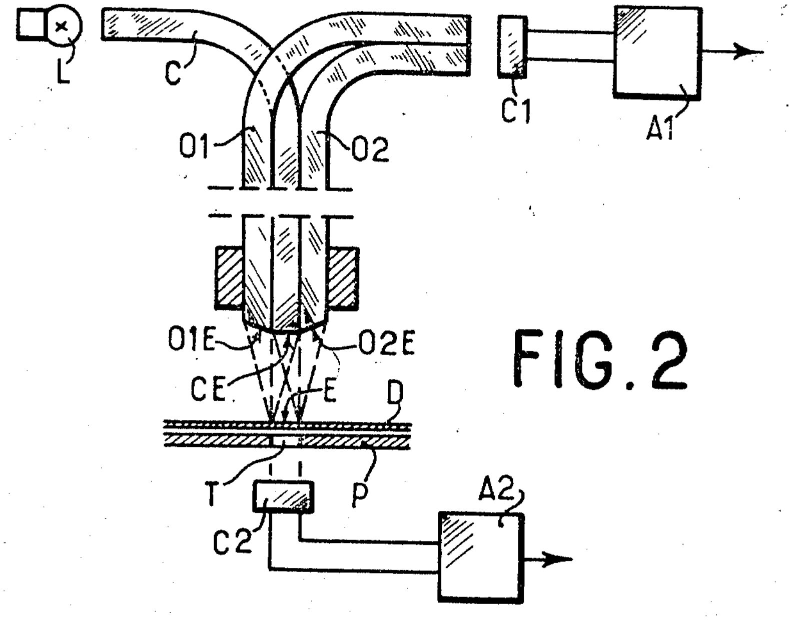
Figure 1B:
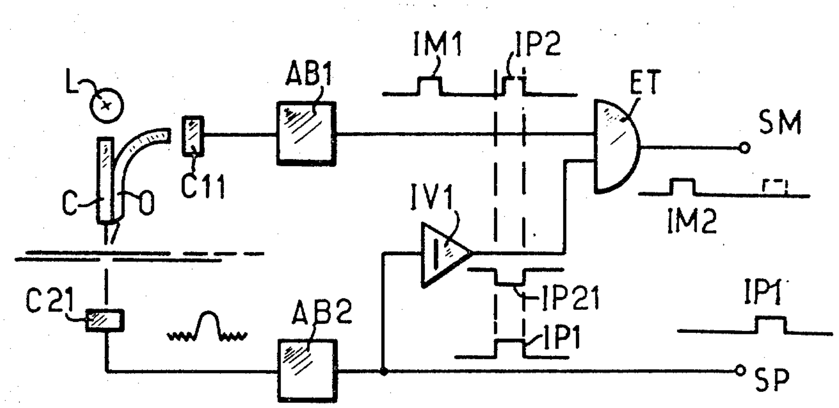
Figure 1C:
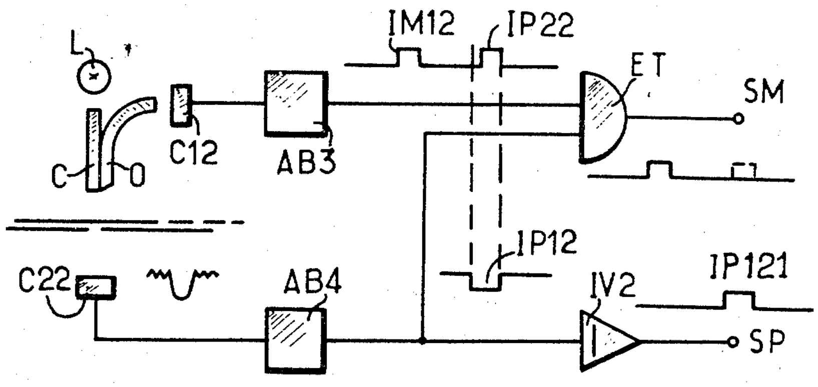
Figure 4:
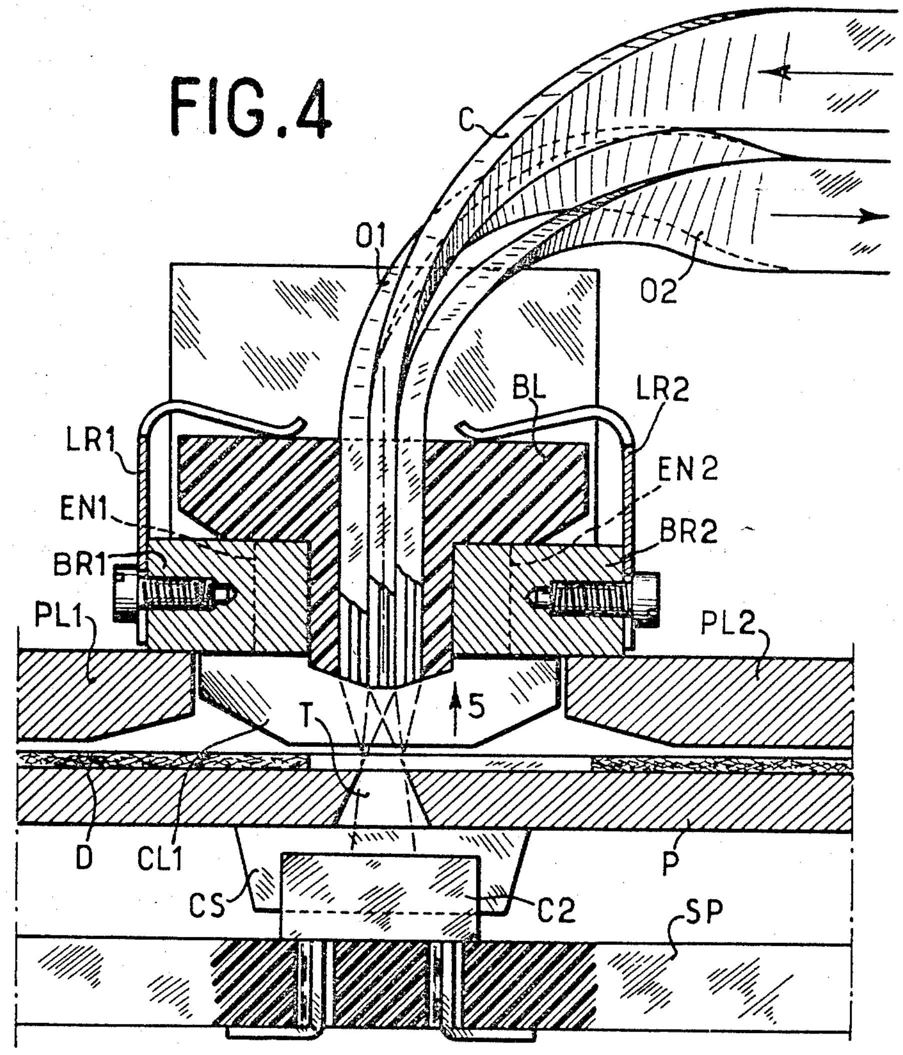

Further advantages and features of the invention will become more clearly apparent in the course of the following description, with reference to the accompanying drawings, in which:

FIG. 1A is a basic circuit diagram for a reader-selector unit according to the invention, FIG. 1B and 1C are basic circuit diagrams of a representation which is less particularised than FIG. 1A, FIG. 2 is a diagrammatic view of a reader according to the invention, FIG. 3A, 3B and 3C illustrate various constructional forms of the optical system of a reading head, FIG. 4 illustrates a reading head in longitudinal section along 4—4 of FIG. 5.

Figure 6:
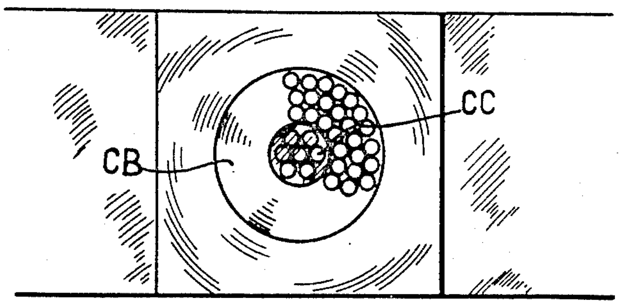

FIG. 5 is a view, drawn to a larger scale, of a part of a reading head assembly according to FIG. 4, as seen from below in the direction of the arrow 5, FIG. 6 illustrates a circular reading head.

The diagram of FIG. 1A shows a reading-selecting device in which the reader proper comprises a light source L, an optical system C, O, and two photoelectric transducers C1 and C2, which are connected to amplifiers A1 and A2 respectively. The first of these transducers is adapted for reading marks by reflection, while the second is adapted for direct reading of perforations. The light source L may be common to a number of readers. The optical system comprises a light channel C, which transmits a part of the light from the source L in order to illuminate a location E past which there are advanced in known manner documents D bearing marks or perforations to be read. A part of the light reflected in the location E by the documents is transmitted to the first transducer through a light conducting channel O, which also forms part of the optical system. In practice, marks are recorded on the documents in the form of dark marks displaying a maximum contrast against a light background.

The passage of dark marks through the location E therefore results in an absorption of light and in a reduction of the luminous flux which is transmitted to the transducer C1. In the described example, this transducer consists of a photoelectric cell which supplies an electric current substantially proportional to the intensity of the luminous flux which is transmitted thereto. A similar result may be obtained in known manner by utilising a colour contrast between the marks and the support and employing as transducer a photo-sensitive element having a predetermined spectral sensitivity on the sensitivity of which is modified by utilisation of a coloured light or by the use of coloured screens. Thus, red marks affixed to a green card or illuminated with green light would be read as very dark marks on a light background by a cadmium sulphide photoelectric cell, which is particularly sensitive to green.

The second transducer C2 is disposed on the other side of the passage of the documents behind a fixed plate P formed with an orifix T situated in the location E, and along the axis of the optical system, in order to receive the light passing through the said orifice when a perforation PF in a document D travels past the reading location E. It is obvious that the light passing through a perforation will not be reflected towards the transducer C1 and that this perforation will be read by the latter as a dark mark, while the transducer C2 will directly receive the light passing through the said perforation. When a recording location which is neither marked nor punched is brought into the reading location E, the transducer C1 receives a maximum luminous flux and supplies a high current, while the arrival of a mark or perforation in this location results in a reduction of the reflected light and a reduction of current, as indicated at LMP on the small graph disposed close to C1, while, on passage of a perforation, the current supplied by C2, which is normally very weak, temporarily rises as indicated at LP on the small graph situated close to C2 in the diagram.

The current supplied by C1 is transmitted by the terminal E1 at the input of the selector circuit S, to an inverting amplifier A1 which converts the reading of marks or perforations into positive electric pulses, while the current supplied by C2 is transmitted by the input terminal E2 to an amplifier A2 which also converts the reading of perforations into positive pulses. The component elements of the selecting circuit are drawn, in the diagram of FIG. 1A, in a dash-dotted contour which bounds the elements of the selector. The description which will be given by way of example in the following of the construction of a selecting circuit has no limiting character. As will hereinafter be shown, other forms of selecting circuit may be envisaged according to the requirements. Therefore, only the function performed by this circuit from the viewpoint of the invention will be considered.

The electric pulses emanating from A1 and from A2 respectively are transmitted to two amplitude discriminating circuits S1 and S2 which are intended to eliminate in known manner the spurious signals of small amplitude which are below a predetermined threshold level. These discriminators transmit triggering pulses to the control inputs EC1 and EC2 respectively to two bistable flip-flop circuits B1 and B2 of known types, which are each provided with a return-to-zero input (RZ1 and RZ2 respectively), which are both connected to a generator GS which transmits a synchronised return-to-zero pulse to the flip-flop towards the end of the reading of each recording location. These pulses may equally well be produced in known manner by a mechanical or photoelectrically controlled switch actuated in synchronism with the advance of the document through the reading device, or they may be more simply produced from the photoelectric reading of synchronising areas entered on the documents. Each flip-flop is provided with two outputs, an upper output SS1 and a lower output SI1 for the flip-flop B1, and outputs SS2 and S12 for the flip-flop B2.

When one of the flip-flops, for example B1, is at rest or in the "0" state, its upper output SS1 is maintained at a reference potential, for example of value "0," while its lower output SI1 is maintained at a voltage level representing the logical "1." When a triggering pulse is applied to the input EC1, the state of the flip-flop is reversed, i.e. its upper output changes to the level "1," while its lower output is brought to the reference potential.

This state is maintained until a return-to-zero pulse is transmitted by GS to the inputs RZ1 and RZ2 of the flip-flops before the reading of a succeeding recording location on a document. The outputs SS1 and SI2 are connected to the inputs ETI and ET2 respectively of a coincidence circuit ET, the output terminal of which constitutes the output SM, which is the "marks" output of the selector. A voltage can be set up at this output only if the two inputs of the circuit ET are simultaneously at the potential 1. The output SS2 of B2 is connected to the output terminal SP, which is the "perforations" output of the selector and which is normally at the potential 0.

The reading-selection unit of FIG. 1A operates as follows:

READING OF A MARK

In the case of the reading of a mark, the light reflected at the location E and transmitted to C1 decreases temporarily and a triggering pulse is applied by S1 to the input EC1 of B1, which flips over. Consequently, the output SS1 changes from 0 to 1 (the output SI1 is not utilised).

In addition, during the reading of a mark, the transducer C2 does not normally receive light coming from L, and at most receives a glimmer which passes through the analysed document if it is more or less translucent. This signal is insufficient to be transmitted by S2. B2 therefore does not flip over and the outputs SS2 and SI2 remain at the potentials 0 and 1 respectively. Under these conditions, the two inputs of ET being at the potential 1, a positive voltage is set up at the output terminal SM to indicate the reading of a mark, until a return-to-zero pulse returns the outputs of B1 to their rest potentials.

READING OF A PERFORATION

When a perforation passes through the reader, the transducer C2 is illuminated by the light passing through the perforation and a triggering pulse is applied by S2 to the input EC2 of B2, which flips over. The output SS2 changes from 0 to 1 and applies voltage to the output SP of the selector, which indicates the reading of a perforation until it is returned to zero. In addition, the passage of a perforation through the reading device being interpreted by C1 in the same way as the passage of a mark, the input ET1 of ET receives a voltage 1 from SS1, but since B2 is also flipped over by the reading of a perforation by C2, the output SI2 of B2 is changed from 1 to 0. Under these conditions, since ET1 is at the potential 1 and ET2 at the potential 0, ET cannot supply any voltage at the output SM. Since the pulse transmitted by B1 to the circuit ET must be blocked by the pulse supplied by B2, the pulse transmitted by B1 commences after that transmitted by B2 and ceases at the latest at the same time as the latter. This condition may also be satisfied in known manner by means of a synchronised sampling device. Depending upon the nature of the transducing devices and upon the electric circuit diagrams employed to utilise them, these devices may be adapted to supply electric reading pulses of different polarity.

In order more clearly to define the general principle of the invention, FIGS. 1B and 1C show two basic diagrams of selecting circuits of different constructions.

The diagram of FIG. 1B relates to the case where the photoelectric transducer C21 supplies reading signals of positive polarity, while the diagram of FIG. 1C relates to a case where the transducer C22 supplies reading signals of negative polarity. In FIG. 1B, the transducer C11 for reading dark marks is connected to a pulse-shaping circuit AB1. It will be assumed that in the block AB1, the functions of amplification, amplitude discrimination and generation of widened positive pulses of pre-determined amplitude and duration from reading signals are performed. Of course, if the latter are of negative polarity, one of the members of the block AB1 must perform the polarity reversal. The transducer C21 which supplies positive signals corresponding to the reading of perforations is connected to a shaping circuit AB2 of the same type as the shapping circuit AB1. However, the pulses supplied by AB1 are slightly retarded in time in relation to those supplied by AB2 and end at the latest at the same time as the latter.

The output of the shaping circuit AB1 is connected (FIG. 1B) directly to an input of the logical coincidence circuit ET, the output SM of which supplies pulses corresponding to the reading of marks. The second input of the circuit ET is connected to the output of the shaping circuit AB2 through a logical inverting circuit IV1 which normally transmits to the input of the circuit ET a positive authorisation voltage "1" which is reversed and converted into inhibiting voltage "0" when the shaper AB2 transmits a pulse of polarity "1" to the output SP in the reading of a perforation by the transducer C21.

The selecting circuit of FIG. 1B operates as follows:

It will be assumed for example that a recording mark is being read by the transducer C11. A reading pulse is transmitted to the shaper AB1 which transmits a positive pulse IM1 to the upper input of ET, which, in the absence of perforation reading by C21, receives from the inverter IV1 a positive authorisation voltage which enables the circuit ET to transmit a mark reading signal IM2 to the input terminal SM.

In the case of the reading of a perforation, the transducers C11 and C21 each transmit a reading pulse to their shaping circuit. The shaper AB2 produces a pulse IP1 which is transmitted to the output terminal SP in order to indicate the reading of a perforation and is also transmitted to the inverter IV1, which temporarily transmits to the second input of ET an inhibiting voltage IP21, which renders ET non-conductive. The reading signal produced by C11 for reading the perforation is shaped by AB1, which transmits to the first input of ET a pulse IP2 (the commencement of which is slightly delayed in relation to IP1), which is rendered non-conductive by the inhibiting voltage supplied by IV1 under the action of the pulse IP1. It will be observed that in this case the function of the inverter IV1 is performed, in the diagram of FIG. 1A, by the lower output SI2 of the flip-flop B2 of this figure.

In FIG. 1C, the shaping circuits AB3 and the AB4 are similar to the shaping circuits AB1 and AB2 of FIG. 1B. It is clear that the block AB3 must include a polarity reversing member only when the reading signals supplied by the transducer C12 are of negative polarity. The outputs of the shaping circuits AB3 and AB4 are connected directly to the inputs of the coincidence circuit ET. The logical inverting circuit IV2 is connected between the output of the shaping circuit AB4 and the output terminal SP.

In the reading of a mark, the pulse IM12 is transmitted to the output SM by the logical circuit ET, since the second input of the latter receives an authorising voltage from AB4. In the reading of a perforation, the second input of the circuit ET receives the inhibiting pulse IP12, which prevents the pulse IP22 from being transmitted to the output SM. At the same time, the perforation reading pulse IP121 appears at the output SP.

As in the case of FIG. 1E, the pulses supplied by the shaping circuit AB3 may be slightly delayed in relation to those supplied by AB4 and may cease at the latest at the same time.

It is to be noted that the precautions indicated in the foregoing in regard to the delay and the duration of the pulses are unnecessary when there is employed a sampling system synchronised with the displacement of the punched cards. It will be appreciated that in this case it is necessary to provide the logical circuit ET with an additional input.

The drawing of FIG. 2 diagrammatically illustrates a reading device according to the invention. The elements corresponding functionally to elements of FIG. 1A bear the same references as in this figure.

In FIG. 2, light emanating from the light source L is conducted through a light channel C to illuminate the location E for the analysis of marks and perforations. The channel C consists (FIG. 2) of a homogeneous strip of transparent material having a high refractive index. For the transmission of light through a channel under good conditions of output (minimum absorption of light by the walls of the channel), the strip is perfectly polished and externally coated with a thin film of a transparent material whose refractive index is substantially lower than that of the strip. The light channel O of FIG. 1, which leads to the transducer C1 a part of the light reflected in the location E, consists (FIG. 2) of two transparent strips 01 and 02 which are identical in their nature to the strip C and are disposed on either side of the latter in the reading head. Their upper parts are curved and terminate in front of the transducer C1, to transmit to the latter a part of the light which has been reflected at E.

FIG. 2 shows a constructional feature which resides in that the end of the light channels has in the reading head, i.e. in the part situated closer to the location in which the recordings are analysed, a particular form adapted to satisfy optical conditions which will hereinafter be specified. While the end CE of the central strip C is cut perpendicularly to the axis of the reading head and substantially, but not necessarily, parallel to the surface of the documents, the ends 01E and 02E of the strips 01 and 02 are bevelled at a predetermined angle. The channels C, 01 and 02 may be formed by assembly of fine rods of transport material. The light channels thus formed have great flexibility which facilitates their positioning in the reading devices.

FIGS. 3A to 3C show various forms of an optical system for reading heads comprising light channels. In the three cases, they may each consist either of a homogeneous strips or of assembled light-conducting fibres.

In FIG. 3A, the channel CA is disposed along the axis of the optical system in order to project a beam of light perpendicularly to and on to the location E of a document D. The light beam emerging directly from the channel CA is slightly divergent and illuminates a surface of width M, which increases with the distance between the channel and the document. It is therefore desirable to employ a channel of minimum dimensions and to locate it also very close to the document, but in this case the reflected rays which are to be collected by the lateral channels OA and OB are at a considerable angle to the axis of the latter and the yield, from the viewpoint of the transmitted light, is relatively poor. It would therefore appear to be an obvious solution to dispose a convergent lens LT between the channels and the document in order to concentrate the incident rays upon a reduced surface and to use the reflected rays to form a substantially parallel pencil of rays which enter the lateral channels under the best conditions. However, this apparently logical solution is costly to apply and necessitates delicate adjustments. The idea has also been conceived, as illustrated in FIG. 3B, of cutting the light channels with a radius of curvature R appropriate for replacing the lens, but this solution is also difficult to apply in industry, especially with channels formed of light-conducting fibres. In FIG. 3C, the central channel C is of reduced cross-section and the end CE of this channel is plane. The illuminated surface SR is of reduced dimensions as compared with the marks or perforations to be read. The surfaces 01E and 02E at the end of the lateral channels 01 and 02 are plane and bevelled at a predetermined angle, taking into account the refractive index of the material of which the light channels consist. This simple arrangement, which is relatively easy to provide, has a remarkable luminous output.

The part referred to as the reading head is that part of an optical system which is closest to the recordings to be read.

FIG. 4 illustrates in section a reading head in position in an arrangement for reading rows of record data. The channels C, 01 and 02 are formed of light-conducting fibres assembled to form strips. In the reading head, the light channels are maintained in a moulder block BL, the lower portion of which is cut, simultaneously with the end of the light channels, as indicated in FIG. 3C. The block BL, which may be seen in FIG. 4, is engaged between two fixed support bars BR1 and BR2 which are fast with fixed guide plates PL1 and PL2 which form in the machine the upper part of a guide path for the documents D. The bars BR1 and BR2 are each formed with slots EN1 and EN2 in which there are engaged thin partitions (CL1, CL2, FIG. 5), which are also slotted and determine the positioning of each reading head in a row. The lower portion of the partitions forms a screen and prevents parasitic influences between neighbouring reading heads, through the dispersed light. Comb-like members LR1 and LR2 are secured to the bars BR1 and BR2 and are provided with flexible strips adapted to pass between the partitions CL and to maintain the blocks BL of the reading heads against the support bars BR1, BR2. A document D bearing marks or formed with perforations is illustrated in FIG. 4, this document being disposed between the guide plates PL1, PL2 and the fixed plate P. The latter is, as already stated, formed with an orifice T behind which there is disposed a transducer C2 which is a photoelectric cell mounted on an insulating support SP. Some of the elements of FIG. 4 have already been illustrated in FIGS. 1 and 2 and bear the same references as in these figures. On the side of the transducers C2, small partitions CS are also provided to prevent the dispersed light from influencing neighbouring transducers.

A row of reading heads comprises, in principle, as many reading heads as there are rows of marks to be explored in parallel on the documents. Thus, for reading standard punched cards column-by-column, there is provided a row of 12 reading heads, but for reading the same cards line-by-line 80 heads are necessary. In the latter case, the spacing PAS of the reading devices (FIG. 5) is only 2.2 millimetres.

In order to increase the capacity of the "80-column" cards, it has been proposed in the past to record by punching between the normal perforation lines. This solution has not received the applications which were envisaged, because the perforations made between the lines considerably reduce the rigidity of the cards, which then cannot pass correctly through machines provided with normal card-feeding mechanisms.

The use of reading devices according to the invention has made it possible to readopt this this idea by making the recordings between the lines, not by punching, but by means of printed or manually applied marks which do not in any way reduce the rigidity of the card and may be processed exactly in the same way as perforations.

In an apparatus such as that illustrated on a large scale in FIGS. 4 and 5, the thickness EP (FIG. 5) of the central channel C of the reading heads do not exceed 0.22 millimetre. FIG. 5 shows in part the relative arrangement of three reading heads BL, BL1 and BL2 forming par of a row. The partitions CL and CL1 position the heads on the support bars BR1 and BR2 and the marks to be analysed are shifted past the reading heads in the direction of the arrow F. It is also possible, in accordance with the aforesaid principles, to provide reading heads for reading marks on documents which may be shifted in different directions.

FIG. 6 shows a "circular" head comprising a central channel CC through which the light is supplied. As illustrated in FIG. 3C for the channel C, the end of his channel is plane and, in order to satisfy the optical conditions illustrated in this figure, the extreme surface of the channel CB which (FIG. 6) surrounds the central channel CC is conical. A reading head, of the model illustrated in FIGS. 4 and 5, scans marks from an illuminated linear surface, while a reading head of the model illustrated in FIG. 6 permits scanning of marks from an illuminated circular surface of small diameter.

It is obvious that the arrangements which have been described by way of example have no limiting character and that modifications may be made in accordance with the requirements and applications without departing from the invention.

I claim:

1. A reading arrangement for reading marks on and perforations in recording media, comprising a reading device composed of a light source associated with a light-conducting channel and of a first photoelectric transducer also responding to a mark or to a perforation and associated with another light-conducting channel, these two light-conducting channels extending on the same side of the recording medium into proximity to a surface thereof which is to be scanned, wherein the said reading device comprises in addition a second photoelectric transducer situated on the other side of the said recording medium to receive light from the said light source through a perforation, this arrangement also comprising:

first connecting means connected to the said first transducer to transmit an output signal to a first output terminal when a mark is read, second connecting means connected to the said second transducer to transmit an output signal to a second output terminal when a perforation is read, and the said first connecting means including a logical coincidence circuit, one input of which is connected to the said second connecting means and adapted to prevent the appearance of an output signal at the said first output terminal when a perforation is read.

2. A reading arrangement according to claim 1, wherein a first pulse-shaping circuit is connected to the said first transducer to supply a pulse of a first polarity at an input of the said coincidence circuit, which is an AND circuit, when a mark of a perforation is read, and a second pulse-shaping circuit is connected between the said transducer and the said second output terminal to supply to the latter a pulse of the said first polarity, an inverting circuit being connected between the output of the said second pulse-shaping circuit and another input of the said AND circuit to supply to the latter a pulse of a polarity opposite to the said first polarity when a perforation is read.

3. A reading arrangement according to claim 2, wherein the pulse-shaping circuit of the said first connecting means includes a delay element and is adapted to supply at its output a square-wave signal whose duration is shorter than the signal supplied by the shaping circuit of the said second connecting means.

4. A reading arrangement according to claim 1, wherein a first pulse-shaping circuit is connected to the said first transducer to supply a pulse of a first polarity to an input of the said coincidence circuit, which is an AND circuit, when a mark or a perforation is read, and a second pulse-shaping circuit is connected between the said second transducer and another input of the said AND circuit to supply to this input a pulse of a polarity opposite to the said first polarity when a perforation is read.

5. A reading arrangement according to claim 4, wherein the pulse-shaping circuit of the said first connecting means includes a delay element and is adapted to supply at its output a square-wave signal of a shorter duration than the signal supplied by the shaping circuit of the said second connecting means.

6. A reading arrangement according to claim 1, wherein each of the said first and second connecting means comprises, starting from the corresponding transducer, amplifying and short pulse-shaping devices and a bistable circuit of the type having two inputs and two outputs, the arrangement being such that the first bistable circuit assumes a predetermined stable state when its first input receives a brief pulse as a result of a mark or a perforation being read by the said first transducer, and such that the second bistable circuit assumes the said stable state when its first input receives a brief pulse as a result of a perforation being read by the said second transducer, a first output of the said first bistable circuit being connected to an input of the said coincidence circuit, which is an AND circuit, the said second bistable circuit having its first output connected to the said second output terminal and its second output, or complementary output, connected to another input of the said coincidence circuit.

7. A reading arrangement according to claim 6, wherein the amplifying and pulse-shaping devices of the said first connecting means include a delay element adapted to supply to the input of the said first bistable flip-flop pulses which are delayed in relation to the pulses applied to the input of the said second bistable flip-flop.

References Cited

UNITED STATES PATENTS 2,448,830 9/1948 Robbins et al. ---- 235—61.11 X
3,248,553 4/1966 Patterson ------- 235—61.11 X DARYL W. COOK, Primary Examiner U.S. Cl. X.R.

250—219